United States Patent [19]

Simpson, II

[11] Patent Number: 5,783,245
[45] Date of Patent: Jul. 21, 1998

[54] METHOD AND APPARATUS FOR PROCESSING DAIRY PRODUCT

[75] Inventor: Robert P. Simpson, II, Barrington, Ill.

[73] Assignee: APV Crepaco, Inc., Rosemont, Ill.

[21] Appl. No.: 838,271

[22] Filed: Apr. 17, 1997

[51] Int. Cl.[6] ............... A23C 1/00; A23C 19/02; A23C 21/00; A23C 21/02

[52] U.S. Cl. ............... 426/580; 99/452; 99/453; 99/456; 99/458; 426/34; 426/491; 210/167; 210/639; 210/652

[58] Field of Search ............... 99/460–465, 452–459, 99/516, 534, 495, 496; 426/549, 590, 477, 580, 491, 34, 239, 271, 656, 583, 657, 72–74, 585, 658, 801; 210/167, 181, 194, 91, 765, 764, 266, 677, 651, 652, 663, 638, 639

[56] References Cited

U.S. PATENT DOCUMENTS

| | | | |
|---|---|---|---|
| 3,691,633 | 9/1972 | Berge | 99/452 |
| 4,216,236 | 8/1980 | Mueller et al. | 426/72 |
| 4,352,828 | 10/1982 | Rialland et al. | 426/580 X |
| 4,460,616 | 7/1984 | Rialland et al. | 426/580 |
| 4,761,295 | 8/1988 | Casey | 426/549 |
| 4,803,089 | 2/1989 | Chaveron et al. | 426/239 |
| 4,876,100 | 10/1989 | Holm et al. | 99/452 X |
| 4,970,989 | 11/1990 | Lidman | 210/651 X |
| 4,978,550 | 12/1990 | Menon et al. | 426/490 X |
| 5,514,282 | 5/1996 | Hibbard et al. | 210/652 |
| 5,531,157 | 7/1996 | Probst | 99/455 X |
| 5,544,571 | 8/1996 | Nahra et al. | 99/454 X |
| 5,597,486 | 1/1997 | Lutz | 210/639 |

*Primary Examiner*—Timothy F. Simone
*Attorney, Agent, or Firm*—Leydig, Voit & Mayer, Ltd.

[57] ABSTRACT

A system for recovery of dairy product from a milk storage tank includes a recovery tank disposed to receive raw milk product from the storage tank, a fluid treatment section disposed to apply treated fluid to the storage tank to loosen residual milk solids from the storage tank and to provide a diluted milk fluid when the storage tank is emptied, and a filtering system disposed to receive the diluted milk fluid from the storage tank, filter the diluted milk fluid, and pass a treated fluid to the recovery tank.

16 Claims, 4 Drawing Sheets

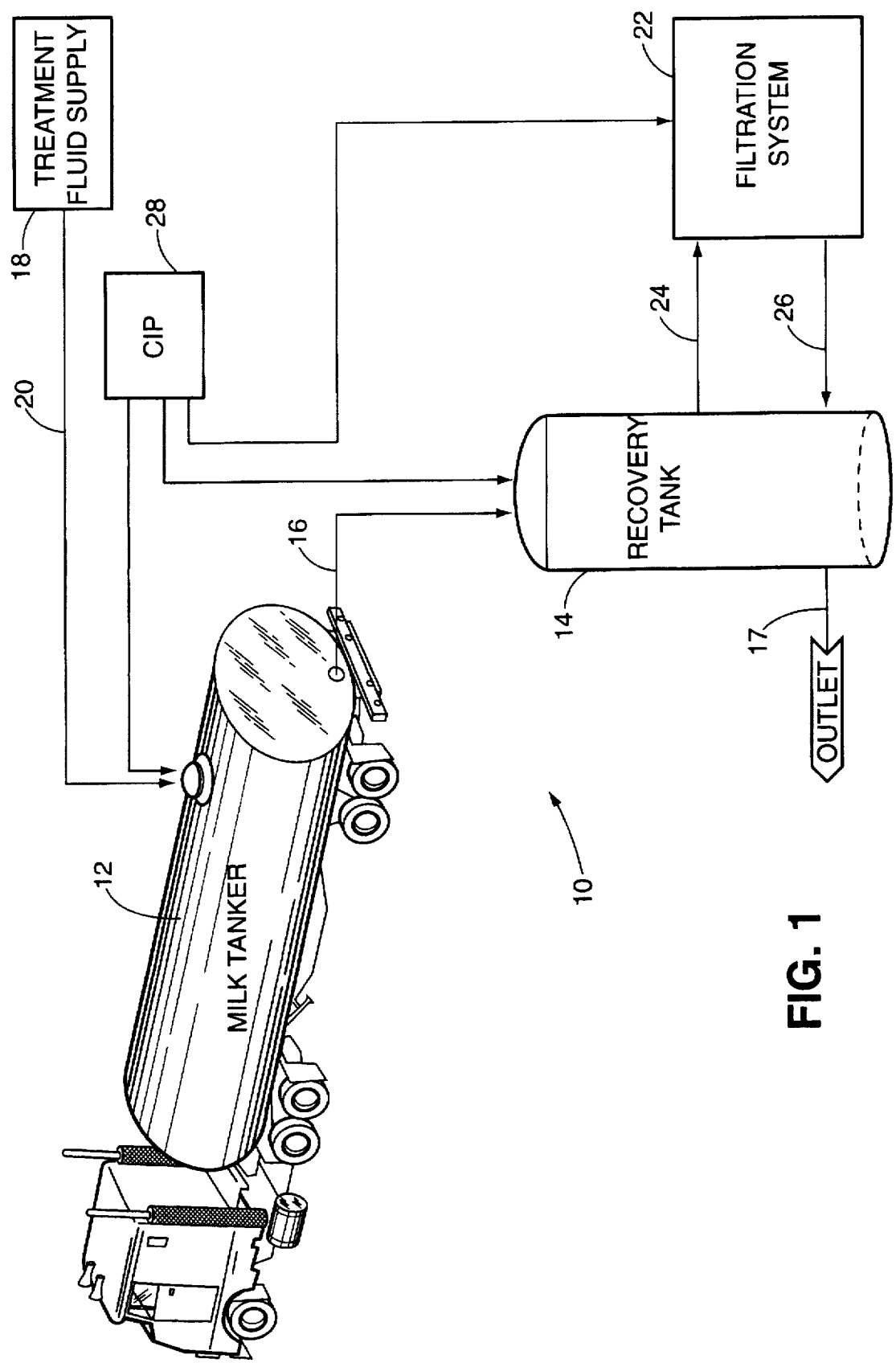

METHOD AND APPARATUS FOR PROCESSING DAIRY PRODUCT

FIELD OF THE INVENTION

The present invention generally relates to the dairy processing art, and more particularly, to a system for processing milk product which includes a reverse osmosis line disposed to recover waste milk material and a method for implementing that system.

BACKGROUND OF THE INVENTION

Fluid milk storage plants are generally known in the art. They typically include a holding or storage tank or vessel equipped to store the fluid milk product. By way of example, the tank may be provided as a semi-trailer or the like that is loaded from a dairy farm. Alternatively, the tank may be a component of a dairy processing system. When the milk tank is emptied such as by gravity feed or appropriate pumping of the contents to another location, residual milk product remains within the tank and associated pipelines. In known systems, such residual milk product is now removed with the use of various cleaning cycles. These typically include a rinse cycle and/or a clean-in-place cycles wherein the residual milk is washed away from the milk plant.

In any event, such fluid milk plants have little or no use for recovered raw and pasteurized milk rinses due to current Federal governmental regulation on adulterated food products, particularly as they relate to Class 1 type fluid milk plants. Accordingly, in known systems, such raw or pasteurized milk rinses are now unrecoverable and are lost to sewage. This creates lost potential revenue and environmental considerations for the dairy manufacturing industry. Of course, it would be desirable to recover residual milk rinses from fluid milk plants so that they could be used in the production of products intended for human consumption.

SUMMARY OF THE INVENTION

Accordingly, it is a general object of the invention to overcome the deficiencies of the prior art.

It is a more specific object of the present invention to provide a milk processing system that dramatically reduces the amount of milk solids eliminated from the system as waste.

It is an additional object of the invention to provide a milk processing plant that provides filtration of the milk rinses to solids for use in all milk classes.

It is yet another object of the invention to provide a milk processing plant that meets applicable safety and health standards.

The present invention provides these and other additional objects with a method for recovery of raw or pasteurized milk rinses and a system for implementing that method in a fluid milk plant. The method is performed after the milk plant has been filled and then emptied in a conventional manner. A burst of treated fluid is applied to the plant to loosen and remove residual milk solids from the storage tank and to provide a diluted milk fluid. The diluted milk fluid is thereafter passed to a filtration system which raises the total milk solids to a desired concentration. The resultant filtered milk product is then provided to a recovery tank at a desired solids concentration. This avoids waste of milk solids in known designs that must be now discarded as waste when the milk plant is emptied. Upon removal of the residual milk product, a standard clean-in-place operation may then be utilized to clean the plant for further use.

BRIEF DESCRIPTION OF THE DRAWINGS

FIG. 1 is a block diagram representation of a system for recovering raw milk solids according to the present invention;

DESCRIPTION OF THE PREFERRED EMBODIMENTS

Figure 2A:
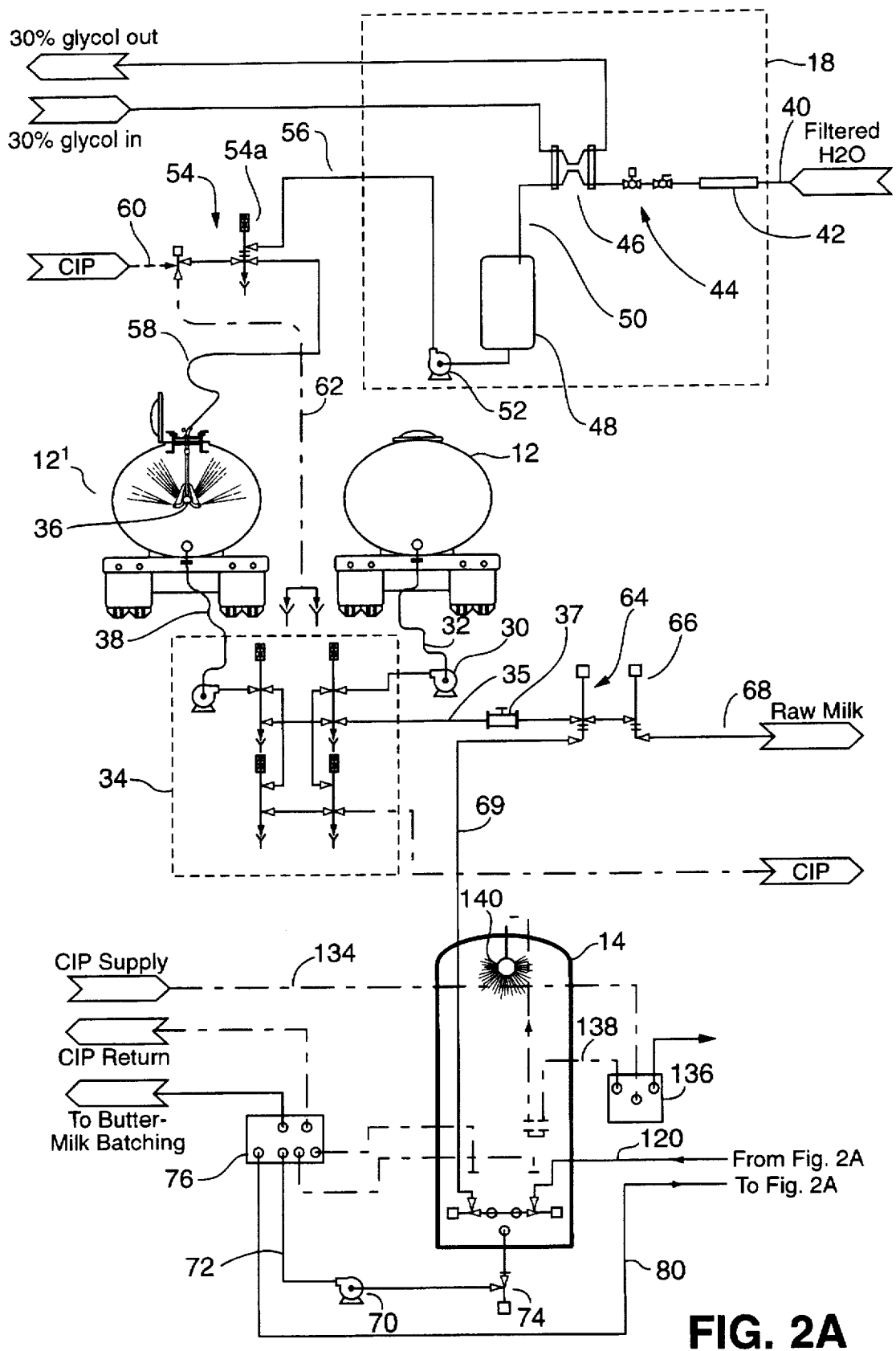
FIGS. 2A and 2B illustrate a more detailed block diagram representation of the recovery system of FIG. 1.

Generally, the present invention relates to a recovery system and method used in a fluid milk plant. The system is adapted to apply a treated fluid to the milk plant after the plant has been emptied in a conventional manner. The treated fluid is applied such that it tends to dislodge residual milk product. A diluted milk product is then emptied from the milk plant and filtered to provide a resulting product with a desired concentration of non-fat and fat solids. Such residual milk rinses were heretofore lost as sewage during a cleaning operation applied to the milk plant.

The invention has particular use in conjunction with raw milk storage tanks such as in semi-trailers. It should be understood, however, that the invention is not limited to such applications and may be used in conjunction with High Temperature, Short Time Pasteurizer ("HTST") systems and other pasteurized milk storage tanks or in other applications where a vessel or chamber of milk is chased with water with appropriate modification.

FIG. 1 shows an illustrative schematic block diagram representation of a recovery system 10 according to the present invention. The recovery system 10 is adapted to receive residual milk product disposed in a milk plant such as a milk storage tank 12 shown in FIG. 1. The invention is typically intended for use after milk product has been emptied from the storage tank 12 and passed to other components of a dairy production line such as a plate cooling system as will be understood by those skilled in the art.

In accordance with the invention, a treatment fluid is applied to the plant to remove any residual milk product after the plant is emptied. This may advantageously applied to the plant with the use of the same apparatus as cleaning-in-place equipment already installed in the plant. In the described embodiment, treatment fluid contained in a treatment fluid supply system 18 is provided through conduit 20 to the plant 12. As described in greater detail below, the fluid is preferably water treated with ultra-violet light which is applied as a burst to the inner walls of the plant 12. This action removes at least a substantial amount of residual milk from the inner walls of the plant and provides a milk rinse solution.

The milk rinse solution is then supplied to a recovery tank 14 via a fluid passageway 16. The recovery tank has an outlet denoted by a line 17 that provides a resultant product to further dairy processing equipment.

For ensuring that the fluid rinses are filtered to provide a desired solids concentration, the removed fluid is treated with a filtering system. In the described embodiment, the fluid milk rinses disposed in the recovery tank 14 are passed to a filtration system 22 at a selected flow rate and pressure via conduit 24. The filtration system 22 is a reverse osmosis system that treats the liquid rinses received from the recovery tank 14. The filtration system 22 operates to raise the solids concentration to a desired level and recirculates a first resultant filtered product to the recovery tank 14 via a conduit 26. A permeate is also collected by the filtration which may be either passed to the recovery tank or discarded.

Once the filtration process is completed and the desired solids concentration is achieved, the fluid contained in the recovery tank 14 is available for further processing to manufacture a desired dairy product or may be emptied into containers for use. In this way, milk solids which were hitherto lost as sewage are recovered by the present invention.

For cleaning the components of the recovery system, a clean-in-place solution is thereafter applied to the various components. As seen in FIG. 1, cleaning solution is supplied from a CIP system 28 via appropriate conduit to the milk plant 12, the filtration system 22, and the recovery tank 14. The solution is also passed through the piping and other components of the system. The cleaning solution is then emptied to sewage as will be understood by those skilled in the art.

Figure 2B:
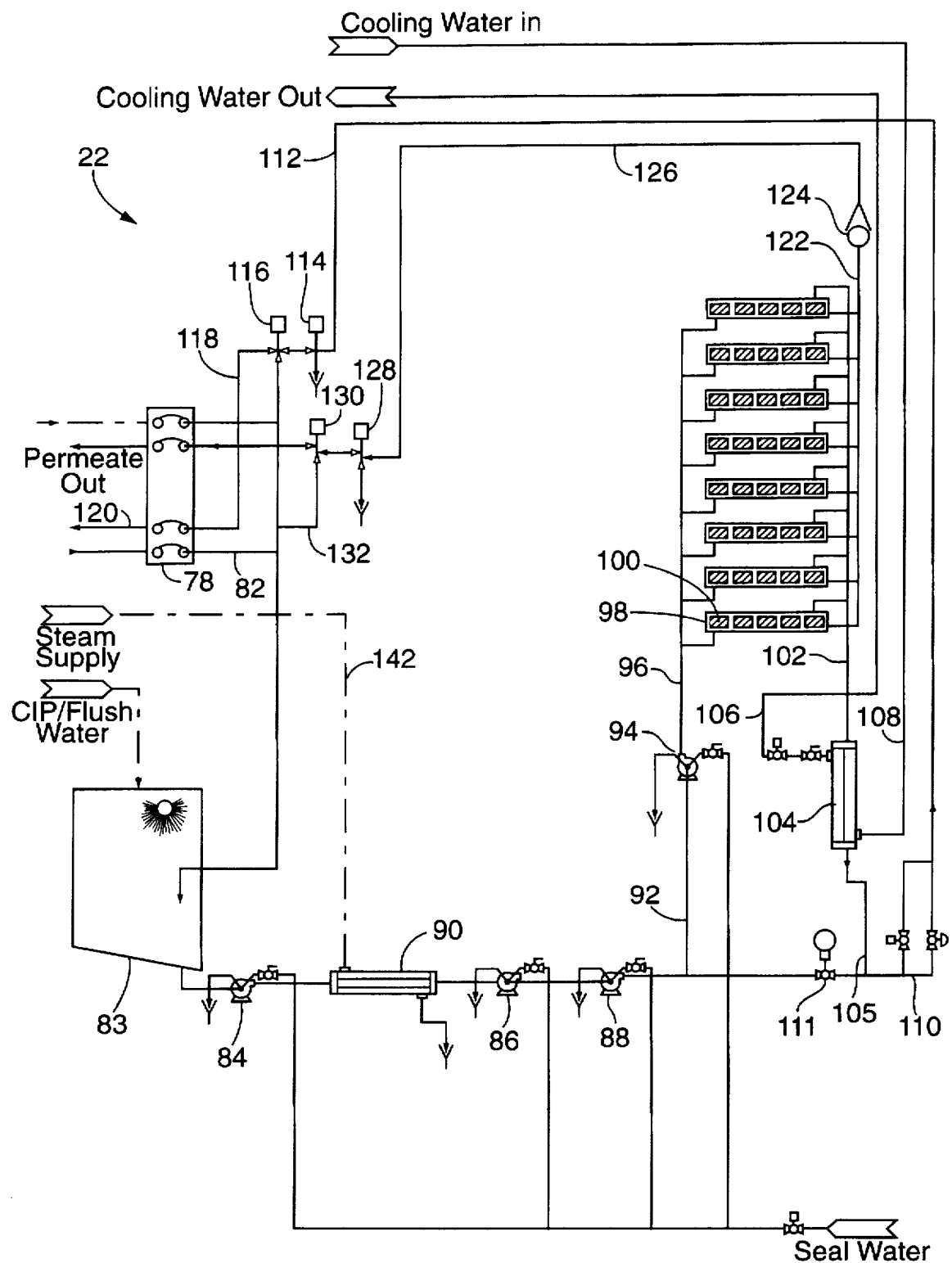

FIGS. 2A and 2B illustrate one preferred implementation of the invention in greater detail. As shown therein, a first storage tank 12 containing raw milk product may be emptied in a conventional mode of operation with the use of a conventional pump 30 coupled with a conduit 32 disposed at the outlet of the storage tank. Raw milk fluid is then passed to a valve cluster 34 which diverts the milk fluid as desired via a conduit 35 and through a T-strainer 37 which acts to filter large debris or other undesired solids from the storage tank 12. The raw milk is thereafter provided to further dairy processing equipment such as a plate cooler, as described below. The raw milk is preferably maintained at a temperature of approximately 40 degrees Fahrenheit.

FIG. 2A also illustrates a raw milk storage tank 12' that has already been emptied. The storage tank 12' has a liquid spray system 36 downwardly extending therein which is secured at an opening formed in the top of the storage tank 12'. The spray system 36 is of general type that is normally adapted to apply a cleaning spray solution to the inner walls of the storage tank 12'. According to the invention, the spray system 36 is adapted to apply a burst of treatment fluid received from a treatment fluid supply 18 to the inner walls of the storage tank 12' in one mode of operation. In accordance with the invention, this action provides a milk rinse solution that is passed through conduit 38 disposed at the outlet of the storage tank 12' to the valve cluster 34.

The details of the treatment fluid supply 18 are also shown in FIG. 2A. In particular, filtered ingredient water is supplied from a supply source (not shown) via a supply conduit 40 at a rate of approximately 5 gallons per minute. The water is passed through an ultra-violet treatment apparatus 42 which removes bacteria from the water. In the preferred embodiment, the treatment apparatus 42 may be a filtered bulb arrangement that sterilizes water passing therethrough such as commercially available equipment from Aqueonics™.

The treated water is then passed via an appropriate valve arrangement and supply conduit 44 to a plate type heat exchanger 46, which is preferably of the type available from APV Crepaco, Inc., the assignee of the present invention. The heat exchanger 44 passes a solution of about 30 per cent glycol as a heat exchange medium for cooling the treated water and to provide a treatment fluid of less than 40 degrees F. The cooled treatment fluid is then passed to a cold water burst surge tank 48 via conduit 50. In the preferred embodiment, the surge tank contains up to approximately 60 gallons of treated water and is maintained at approximately 34 degrees F.

When a burst of treatment fluid is required for cleaning the residual milk product from the storage tank, the treatment fluid is pumped from the surge tank 48 with the use of a waterflush pump 52. The treatment fluid is pumped to a valve arrangement 54 via a supply conduit 56. The valve arrangement 54 includes a double-seated valve 54a that selectively provides a passageway for the treatment fluid to be supplied to the spraying system 36 via a conduit 58.

FIG. 2A also illustrates a conduit 60 that provides a passageway for cleaning solution to a three-way valve 54b, which is part of the valve arrangement 54. In the mode of operation described above, the three-way valve 54b isolates the cleaning solution from the system. In another cleaning mode of operation, the valve arrangement is adapted to permit cleaning solution to be provided to the spraying system 36 for cleaning the storage tank 12'. In addition, a fluid passageway 62 is provided to permit cleaning solution to be provided to other components of the system.

After the treatment fluid is provided as a burst through the spraying system disposed in the tank 12', the diluted milk fluid is passed through the valve cluster 34 and to a double-seated valve 64. The valve selectively diverts the dilute fluid to the recovery tank 14 via a conduit 69. These double-seated valves 64 and 66 also isolates the diluted milk line from the incoming raw milk line and insures that no adulteration of the raw milk will occur. As noted above, raw milk provided through the valve 64 is thereafter passed through a second double-seated valve 66 and supplied through a line 68 to appropriate further processing apparatus. For example, the raw milk may be supplied to a plate cooler or the like as will be understood by those skilled in the art.

In keeping with the invention, the double-seated valves are implemented as a double seat valve with precise monitoring of the valve position, of the type disclosed in patent application Ser. No. 08/553,105, filed Nov. 3, 1995, the subject matter of which is incorporated herein in its entirety. These valve arrangements provide a single axis, double seat valve that includes a longitudinal valve axis, a first valve segment mounted to a valve stem in alignment with the valve axis, and a second valve segment spaced axially from the first valve segment, which is also mounted to a second valve stem spaced inwardly from the first valve stem. A switch monitoring assembly monitors axial movement and loss of valve seat contact of the first valve seat and the second valve seat. In this way, the position of the valve seats can be measured to within about 0.005 inches of movement of the upper or lower valve seats. This permits selective fluid communication with the desired fluid paths, whether for supplying raw milk or diluted milk rinses. In some instances, one or both fluid paths carry milk product, while in other instances, the fluid paths carry cleaning solution.

When dilute milk fluid is provided to the valve cluster 34 and through conduit 35, the double-seated valve 64 is oriented to divert the fluid through a conduit 69 and to a recovery tank 14.

For adjusting the concentration of solids contained in the milk rinses supplied to the recovery tank are provided to a cold milk reverse osmosis filtration system and then returned to the recovery tank. In the illustrated embodiment, the dilute milk rinses contained in the recovery tank 14 are pumped via a pump 70 which is located in a diluted milk feed supply line 72. An on-off valve 74 is also disposed at the outlet of the recovery tank 14.

The diluted milk supply line also includes a pair of flow divert panels 76, 78 which selectively passes the dilute milk fluid via a supply conduit 80 to the filtration system 22, shown in FIG. 2B. The filtration system 22 is preferably a reverse osmosis filtration system wherein the solids contained in the dilute milk rinses are contacted with a porous membrane under a desired pressure. A rinse solution or permeate lower in solute concentration emerges from the other side of the membrane and discarded. In this way, a desired concentrate of milk may be returned to the recovery tank 14.

In the described embodiment, the dilute milk fluid is passed through the divert panel 78 and provided via a conduit 82 to a filtration balance tank 83. The fluid is passed at the outlet of the balance tank to a series of three centrifugal pumps 84, 86, and 88. These centrifugal pumps are arranged in series to ensure that the fluid achieves proper flow and pressure conditions prior to introduction of the fluid to the filtration section 22. Also included in this feed section are temperature and pressure sensors and transmitters, a security screen to protect the filtration membranes form debris, and a sanitary flow meter used to control the feed/concentrate ratio of the fluid (not shown). In addition, a tubular heat exchanger 90 is disposed in this feeding path. The heat exchanger 90 is utilized to heat cleaning solution passed through the feeding path during cleaning operations only.

For applying the diluted milk fluid to the filtration section, the fluid is passed from the outlet of the centrifugal pump 88 via a supply conduit 92 to a filtration inlet pump 94. The fluid is then passed to the membrane filtration section at a desired flow rate and pressure on a line 96. As shown in FIG. 2A, the illustrated filtration section comprises eight stacked membrane housings such as housing 98, preferably fabricated of stainless steel. Each housing is designed to contain five sanitary spiral-wound polymeric membrane elements such as element 100 contained within the housing 98. Of course, the desired pressure and flow rate conditions, as well as the size of the filtration section, is dependent on the volume of rinse solution processed in a given amount of time.

In order to return the concentrate solution from the filtration section, the invention provides a concentrate return path. In particular, the filtration section provides a concentrate solution at a line 102. This solution is passed through a heat exchanger 104 which functions to maintain the concentrate solution at a temperature of less than about 45 degrees F. In this regard, cooling water utilized as a heat exchange medium is received by the heat exchanger via a line 106 and exits the exchanger via a line 108. The concentrate solution is then supplied via a conduit 105 through an appropriate valve arrangement 110. A flow valve 111 is also located in the conduit path 105 which permits the filter section to be by-passed during cleaning.

The concentrate solution is passed via conduit denoted by a line 112 to a pair of divert valves 114, 116 which may optionally permit the concentrate solution to be passed to drain. In addition, the solution may be diverted by the valve 116 to the filtration balance tank via the line 84. Alternatively, the solution is provided on a line 118 to the flow divert panel 78 and recycled back to the storage tank 14 on a line 120.

For collecting the permeate from each of the filtration modules, a permeate return path is provided. In this regard, permeate is collected on a common permeate manifold or header 122. The header provides the permeate to a permeate flow meter 124 disposed to measure the flow of the permeate. The permeate is then provided via a line 126 to a pair of three-way divert valves 128, 130. As with the concentrate return path, the divert valves provide the option to divert the permeate to drain, to recycle the permeate back through the recovery tank via a line 132, or to pass through the flow divert panel 78 and be collected at an output.

For cleaning the recovery tank and the filtration section, a cleaning system is also provided. As shown in FIGS. 2A and 2B, cleaning solution received from a CIP supply is provided on conduit denoted by a line 134 to a flow divert panel 136. In this way cleaning solution may be provided to the storage tank 14 via a line 138. The illustrated storage tank 14 includes a cleaning spray device 140 as will be understood by those skilled in the art.

The filtration system may be cleaned in a similar fashion. In particular, cleaning fluid such as flush water may be supplied to the filtration balance tank 28 which is utilized as a CIP holding tank. In a cleaning mode of operation, cleaning solution is passed through the inlet and outlet conduit and other components of the system. As noted above, the filtration inlet section preferably includes a heat exchanger 90 disposed to increase the temperature of the cleaning solution utilized. This is accomplished by applying steam from a supply at a line.

Figure 3:
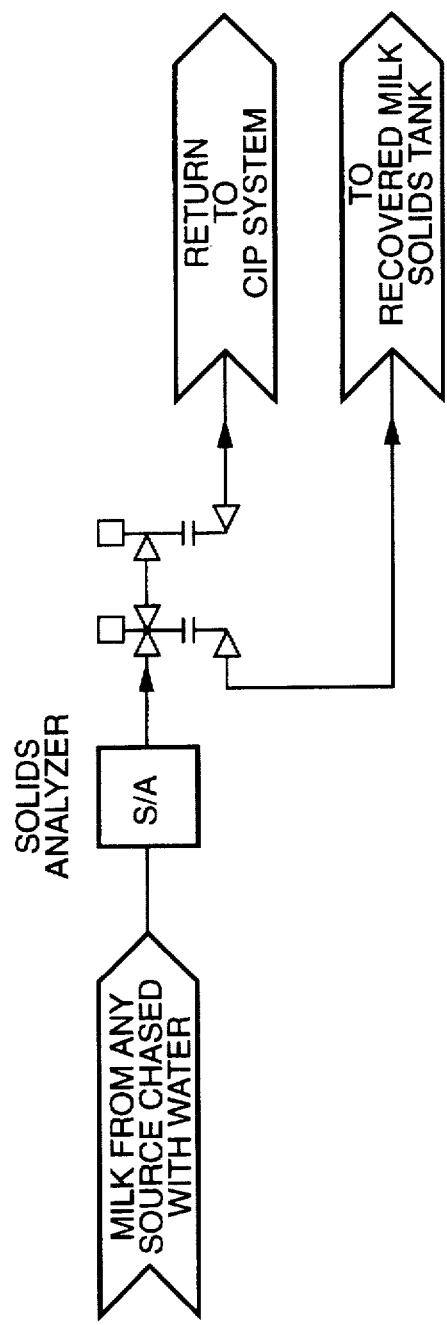
FIG. 3 is a block diagram representation of another aspect of the invention.

In another application of the invention, milk product may be recovered from components associated with the cleaning of an HTST-type pasteurizer in a milk plant, such as is shown in FIG. 3. That is, in any application wherein it is desirable to dilute milk with a source of water, the solution may be optionally be provided through a solids analyzer. Thereafter, the solution may be diverted a recovery tank. In such an application, the diluted milk solution is recovered cold in a separate pasteurized side tank holding area in accordance with the methods and apparatus described above. A clean-in-place system is thereafter utilized to clean the components of the milk plant.

Accordingly, a recovery system and method for using the same that meets the aforestated objectives has been described. The recovery system insures cold recovery of raw milk solids which are then processed in a cold reverse osmosis system in order to raise the total solids non-fat. While the invention has been described in terms of the best mode currently contemplated, those skilled in the art will appreciate that various modifications may be made without departing from the spirit and scope of the invention, as defined by the appended claims. Thus, it should be understood that there is no intention to limit the invention to the specific form disclosed, but on the contrary, the intention is to cover all modifications, alternative constructions and equivalents.

What is claimed is:

1. A method for recovery of dairy product from a milk storage tank including the steps of, emptying the raw milk product from the storage tank with a conventional drain system with at least a residual raw milk product remaining in the storage tank.

applying a burst of treated fluid to the storage tank to loosen the residual milk product from the storage tank and providing a diluted milk fluid, emptying the diluted milk fluid from the storage tank and supplying the diluted milk fluid to a recovery tank.

filtering the diluted milk fluid received from the recovery tank with a filtration system and providing at least a first resulting product with an increased solid content, and selectively recirculating the first resulting product as filtered diluted milk fluid back to the recovery tank at a desired fat concentration.

2. The invention of claim 1 wherein the filtering step further includes providing a second resulting product, and discarding the second resulting product as waste.

3. The invention as in claim 1 further including the step of applying a cleaning solution to the storage tank after the diluted milk fluid is emptied from the storage tank.

4. The invention as in claim 3 wherein the first resulting milk product has a solids nonfat concentration of at least 9 per cent by weight.

5. The invention as in claim 3 wherein the first resulting milk product has a solids nonfat concentration of approximately 10 per cent by weight.

6. The invention as in claim 5 wherein the first resulting milk product has a fat concentration of between 4 and 5 per cent by weight.

7. The invention as in claim 1 wherein the treated fluid is water having been treated with ultraviolet light to remove bacteria therefrom.

8. The invention as in claim 1 wherein the treated fluid is maintained at less than approximately 40 degrees F.

9. A system for recovery of dairy product from a milk storage tank comprising:

a recovery tank disposed to receive milk product from the storage tank;

a treated fluid system disposed to apply a burst of treated fluid to the storage tank to loosen residual milk solids from the storage tank and to provide a diluted milk fluid to the recovery tank;

a filtering system disposed to receive the diluted milk fluid from the storage tank, to increase the solids concentration of the diluted milk fluid, and pass a treated milk fluid of a selected solids concentration to the recovery tank; and a cleaning system disposed to selectively apply a cleaning solution to the storage tank, the recovery tank, and the filtering system.

10. The invention as in claim 9 wherein the treated milk fluid has a solids nonfat concentration of at least approximately 9 per cent by weight.

11. The invention as in claim 9 wherein the treated fluid is water which has been treated with ultraviolet light.

12. The invention as in claim 11 wherein the water is maintained at a temperature of less than about 40 degrees Fahrenheit.

13. The invention as in claim 9 wherein the filtering system comprises:

a balance tank coupled with the recovery tank, a reverse osmosis filter coupled with the balance tank including a plurality of membranes disposed to receive the diluted milk fluid and to provide the treated milk fluid at a first outlet and a permeate at a second outlet, a first return path coupled between the first filter outlet and the recovery tank disposed to selectively provide a passageway therebetween, and a second return path coupled between the second filter outlet and the balance tank disposed to selectively provide a passageway therebetween.

14. The invention as in claim 13 further comprising a pumping arrangement located between the balance tank and the reverse osmosis filter disposed to provide the diluted milk fluid at a selected pressure and flow rate.

15. A filtration system disposed to process milk solid residual product from a storage tank comprising:

a fluid treatment section disposed to apply a burst of treatment fluid to the storage tank and to provide a diluted milk solution;

a recovery tank coupled with the fluid treatment section disposed to receive the diluted milk solution;

a filtration system disposed to receive the diluted milk solution from the recovery tank and to provide a permeate at a first outlet and a concentrate at a second outlet, the second outlet being selectively coupled with the recovery tank to recycle the concentrate back to the recovery tank for further use as a milk product.

16. The invention as in claim 15 wherein the filtering system comprises:

a balance tank coupled with the recovery tank, a reverse osmosis filter coupled with the balance tank including a plurality of membranes disposed to receive the diluted milk fluid and to provide the treated milk fluid at the first outlet and a permeate at the second outlet, a first return path coupled between the first filter outlet and the recovery tank disposed to selectively provide a passageway therebetween, and a second return path coupled between the second filter outlet and the balance tank disposed to selectively provide a passageway therebetween.

* * * * *